United States Patent
Kim et al.

(10) Patent No.: US 10,063,541 B2
(45) Date of Patent: Aug. 28, 2018

(54) USER AUTHENTICATION METHOD AND ELECTRONIC DEVICE PERFORMING USER AUTHENTICATION

(71) Applicants: Yong-Pyo Kim, Seoul (KR); Min-Soo Kang, Suwon-Si (KR); Ki-Hong Kim, Osan-Si (KR); Je-Sang Lee, Seoul (KR); Min-Ja Han, Seoul (KR)

(72) Inventors: Yong-Pyo Kim, Seoul (KR); Min-Soo Kang, Suwon-Si (KR); Ki-Hong Kim, Osan-Si (KR); Je-Sang Lee, Seoul (KR); Min-Ja Han, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 134 days.

(21) Appl. No.: 14/968,382

(22) Filed: Dec. 14, 2015

(65) Prior Publication Data
US 2016/0191515 A1 Jun. 30, 2016

(30) Foreign Application Priority Data
Dec. 29, 2014 (KR) .................... 10-2014-0192550

(51) Int. Cl.
*H04L 29/06* (2006.01)
*G06F 3/0488* (2013.01)
(Continued)

(52) U.S. Cl.
CPC ........ *H04L 63/0861* (2013.01); *G06F 3/0488* (2013.01); *G06F 7/58* (2013.01); *G06F 21/32* (2013.01); *G06K 9/00067* (2013.01); *G06K 9/00288* (2013.01); *G06K 9/00617* (2013.01); *G06K 9/00892* (2013.01); *G06K 9/6293* (2013.01); *H04W 12/08* (2013.01); *G06K 2009/00932* (2013.01); *H04L 63/083* (2013.01); *H04L 2463/082* (2013.01)

(58) Field of Classification Search
CPC .................................................. H04L 63/0861
See application file for complete search history.

(56) References Cited

U.S. PATENT DOCUMENTS 7,908,645 B2  3/2011 Varghese et al.
7,941,836 B2  5/2011 Pinkas et al.
(Continued)

FOREIGN PATENT DOCUMENTS

KR  101281875 B1 * 8/2013
WO  2012138004 A1  10/2012
(Continued)

*Primary Examiner* — Shawnchoy Rahman
(74) *Attorney, Agent, or Firm* — Volentine, Whitt & Francos, PLLC

(57) ABSTRACT

Provided are a user authentication method and an electronic device performing the method. The method is performed under the control of a processor and includes inputting a user authentication request for identifying a user, generating random number data that corresponds to knowledge-based authentication information in the user authentication request, generating an authentication code by combining biometrics-based authentication information in the user authentication request and the random number data, and processing the user authentication request based on the authentication code.

16 Claims, 25 Drawing Sheets

(51) Int. Cl.
   *G06F 7/58*     (2006.01)
   *H04W 12/08*    (2009.01)
   *G06F 21/32*    (2013.01)
   *G06K 9/00*     (2006.01)
   *G06K 9/62*     (2006.01)

(56) References Cited

U.S. PATENT DOCUMENTS

| | | | |
|---|---|---|---|
| 7,949,881 | B2 | 5/2011 | Imura |
| 7,978,859 | B2 | 7/2011 | Conrado et al. |
| 8,140,854 | B2 | 3/2012 | Ogawa |
| 8,230,489 | B2 | 7/2012 | Pinkas et al. |
| 8,253,531 | B2 | 8/2012 | Davis et al. |
| 8,279,182 | B2 | 10/2012 | Kim et al. |
| 8,443,199 | B2 | 5/2013 | Kim et al. |
| 8,490,874 | B2 | 7/2013 | Brown et al. |
| 8,595,804 | B2 | 11/2013 | Pratt et al. |
| 8,601,552 | B1 | 12/2013 | Bowers et al. |
| 8,613,052 | B2 | 12/2013 | Weiss |
| 8,646,060 | B1 | 2/2014 | Ben Ayed |
| 8,667,560 | B2 | 3/2014 | Albisu |
| 8,683,232 | B2 | 3/2014 | Yuen et al. |
| 9,083,510 | B1* | 7/2015 | Lakshman ............ H04L 9/0863 |
| 2003/0117485 | A1* | 6/2003 | Mochizuki ............ G06T 13/40<br>348/14.01 |
| 2005/0249236 | A1* | 11/2005 | Walden ................. H04L 1/0061<br>370/465 |
| 2007/0118758 | A1* | 5/2007 | Takahashi ............. G06F 21/305<br>713/186 |
| 2009/0070593 | A1 | 3/2009 | Boshra et al. |
| 2010/0225443 | A1 | 9/2010 | Bayram et al. |
| 2012/0144194 | A1* | 6/2012 | Zhao ....................... H04L 63/08<br>713/168 |
| 2013/0227678 | A1 | 8/2013 | Kang et al. |
| 2013/0267200 | A1 | 10/2013 | Weiner et al. |
| 2016/0125416 | A1* | 5/2016 | Spencer ............ G06Q 20/1085<br>705/71 |

FOREIGN PATENT DOCUMENTS

| | | |
|---|---|---|
| WO | 2013141439 A1 | 9/2013 |
| WO | 2013187789 A1 | 12/2013 |

* cited by examiner

USER AUTHENTICATION METHOD AND ELECTRONIC DEVICE PERFORMING USER AUTHENTICATION

CROSS-REFERENCE TO RELATED APPLICATION

This application claims the benefit of Korean Patent Application No. 10-2014-0192550 filed on Dec. 29, 2014, the disclosure of which is hereby incorporated by reference.

BACKGROUND

The inventive concept relates to user authentication methods and electronic devices performing user authentication. More particularly, the inventive concept relates to user authentication methods providing enhanced security and electronic devices performing user authentication.

When a user desires to access a network, system, or electronic device, an authentication determination regarding the user must be made. That is, the system being accessed must determine whether the user is authorized or appropriate to gain access to one or more features (e.g., data, functionality, etc.) of the system. In this context, as examples, the user may desire access to an electronic or mobile payment system. In some circumstances access to the network, system and/or electronic device may be made through an intermediary device, such as a wearable device.

Biometric factors and related information associated with the user have been used during authentication procedures. However, when biometric information is stored as a fixed value it is subject to being hacked. Further, if during the acquisition, storage and/or use of biometric information, the biometric information becomes corrupted, then user authentication based on the biometric information may fail.

SUMMARY

Embodiments of the inventive concept provides user authentication methods having enhanced security and improved user authentication procedures. Other embodiments of the inventive concept provide networks, systems and electronic devices capable of performing user authentication with greater security and accuracy.

According to an aspect of the inventive concept, there is provided a user authentication method performed under the control of a processor, the user authentication method including inputting a user authentication request for identifying a user, generating random number data that corresponds to knowledge-based authentication information in the user authentication request, generating an authentication code by combining biometrics-based authentication information in the user authentication request and the random number data, and processing the user authentication request based on the authentication code.

According to another aspect of the inventive concept, there is provided a user authentication method performed under the control of a processor, the user authentication method including inputting a touch pattern and fingerprint information to a touch screen panel, generating random number data that corresponds to the touch pattern, generating an authentication code by combining the fingerprint information and the random number data, generating a verification code by combining reference fingerprint information and the random number data, and accepting, when the authentication code is the same as the verification code, the user authentication request.

According to another aspect of the inventive concept, there is provided a method of operating an electronic device, the method being performed under the control of a processor and including inputting a user authentication request of a user, wherein the first authentication request is for performing a first operation, generating random number data that corresponds to knowledge-based authentication information in the user authentication request, generating an authentication code by combining biometrics-based authentication information in the user authentication request and the random number data, processing the user authentication request based on the authentication code, and determining whether to perform the first operation according to a result obtained by processing the user authentication request.

According to another aspect of the inventive concept, there is provided an electronic device including a sensor obtaining knowledge-based authentication information and biometrics-based authentication information in a user authentication request of a user, wherein the user authentication request is for performing a first operation, a security processing unit generating random number data that corresponds to the obtained knowledge-based authentication information, and processing the user authentication request based on an authentication code generated by combining the obtained knowledge-based authentication information and the random number data, and a first operation performing unit performing the first operation when the user authentication request is accepted.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
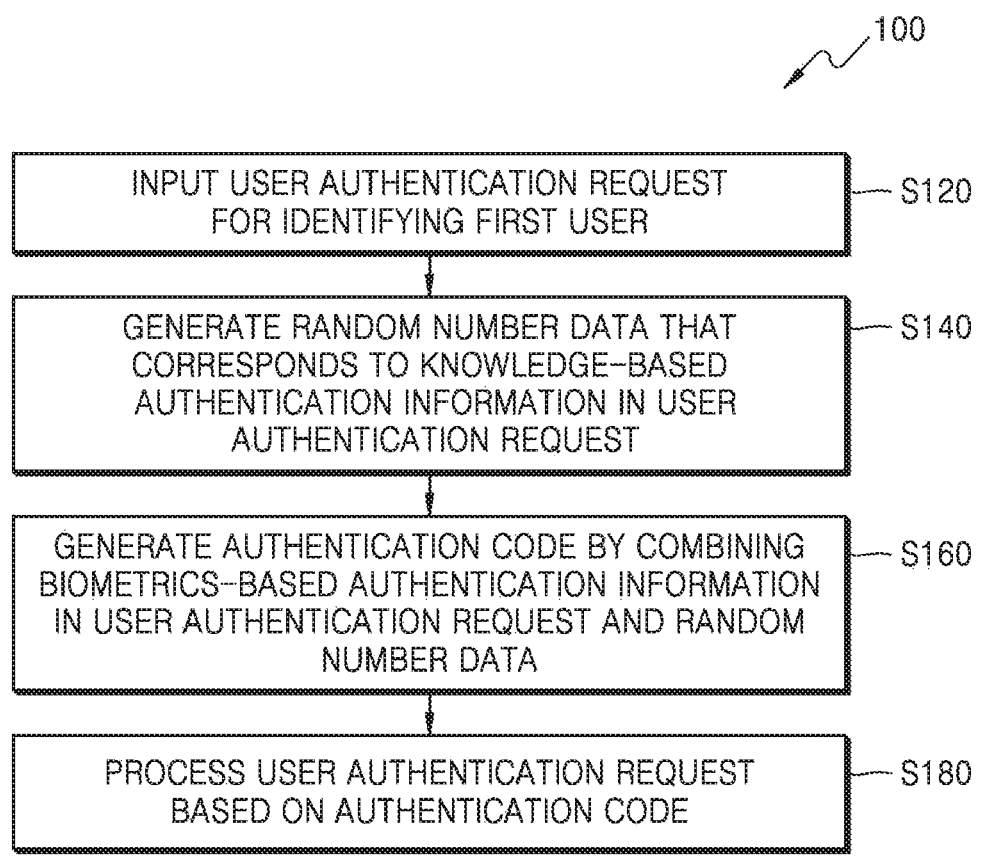
FIG. 1 is a flowchart illustrating a user authentication method according to an embodiment of the inventive concept.

Reference will now be made in some additional detail to embodiments of the inventive concept, examples of which are illustrated in the accompanying drawings, wherein like reference numerals refer to like elements throughout. In this regard, the present embodiments may have different forms and should not be construed as being limited to only the illustrated embodiments. Accordingly, the embodiments are merely described below, by referring to the figures, to explain aspects of the present description. Expressions such as "at least one of," when preceding a list of elements, modify the entire list of elements and do not modify the individual elements of the list.

Figure (FIG. 1 is a flowchart illustrating a user authentication method 100 according to an embodiment of the inventive concept. Referring to FIG. 1, the user authentication method 100 includes inputting a user authentication request for identifying a user (S120), generating random number data corresponding to knowledge-based authentication information included in the user authentication request (S140), generating an authentication code by combining biometrics-based authentication information included in the user authentication request and the random number data (S160), and processing the user authentication request based on the generated authentication code (S180).

Each operation of the user authentication method 100 may be performed under the control of a processor. The processor may be a component of an electronic device executing the user authentication method 100. The processor may have various structures. For example, the processor may include two or more processors, or processor cores, capable of performing different operations. Consistent with at least one embodiment of the inventive concept, the control unit 1080 of FIG. 10 will be recognized as a processor capable of executing the authentication method of FIG. 1.

In this regard, a "user authentication request" may be input via a network, system, or electronic device by a user seeking access to a "target system" (i.e., a network, system and/or electronic device to which access is sought). Here, the user authentication request may be made directly to the target system or via another network, system or electronic device. For example, a user authentication request may be input via a mobile device to access or "unlock" the mobile device. Alternately, rather than accessing the mobile device as an entire functional unit, the user authentication request may be used to access one or more applications, functions or features provided by the mobile device, such as a payment application executed on the mobile device. In either general approach (i.e., device level access or feature level access), the mobile device may be used to determine whether the user authentication request is valid (i.e., verifiably related to an authorized user) using the user authentication method 100 of FIG. 1.

The user authentication method 100 of FIG. 1 provides enhanced security when performing user authentication by combining a random number data corresponding to the knowledge-based authentication information with biometrics-based authentication information. This approach will be described in some additional detail hereafter.

Figure 2:
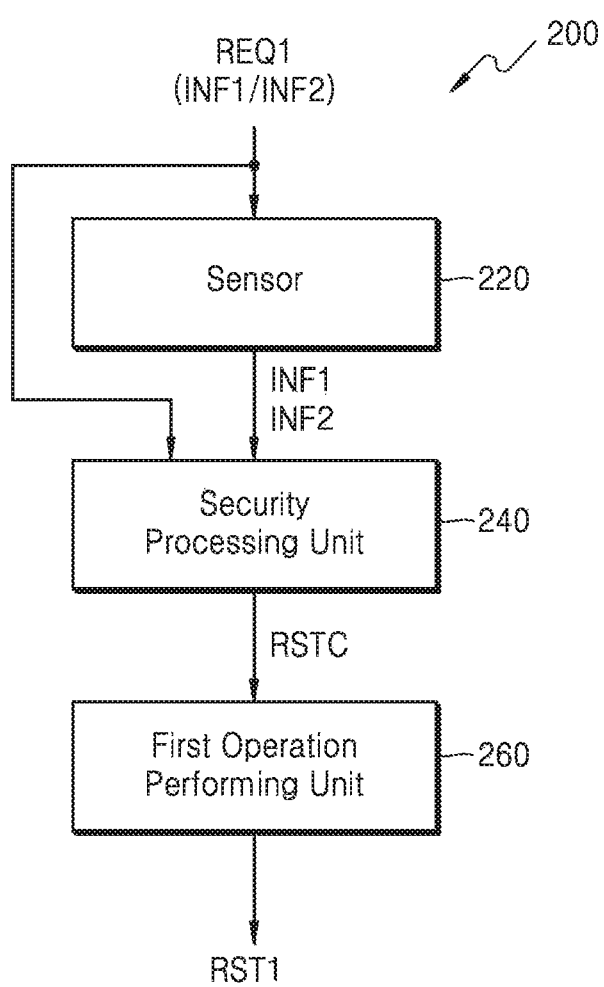
FIGS. 2, 3, 4, 5, 6, 7 and 8 (collectively, "FIGS. 2 to 8") are diagrams variously describing electronic devices according to embodiments of the inventive concept.

FIG. 2 is a block diagram illustrating an electronic device 200 according to an embodiment of the inventive concept. The electronic device 200 may perform user authentication using the user authentication method 100 of FIG. 1 to determine whether a user should be granted access, and possible at what level, to a network, system, electronic device, application or feature. Accordingly, the electronic device 200 may include a sensor 220, a security processing unit 240, and a first operation performing unit 260.

When a user authentication request REQ1 is input to the electronic device 200, the sensor 220 obtains both knowledge-based authentication information INF1 and biometrics-based authentication information INF2 included in the user authentication request REQ1. The user authentication request REQ1 may be input by the user to perform a first operation on the electronic device 200, where the first operation may include the locking or unlocking of the electronic device 200, as well as the executing of an application on the electronic device 200.

The knowledge-based authentication information INF1 may include information consistent with knowledge held by the user (e.g., a password, an identification (ID) number, a registration number, a personal identification number (PIN), an answer to a question, a digital signature, or applied pattern information). In this regard, applied pattern information may take one of many different forms including as examples, a motion pattern, a voice pattern, and a touch pattern.

The biometrics-based authentication information INF2 may include information indicative of an inherent and unique characteristics of the user (e.g., fingerprint information, iris information, retina information, vein information, face information, and voice information). The digital signature may be regarded not only as the knowledge-based authentication information INF1 but also as the biometrics-based authentication information INF2.

Figure 3:
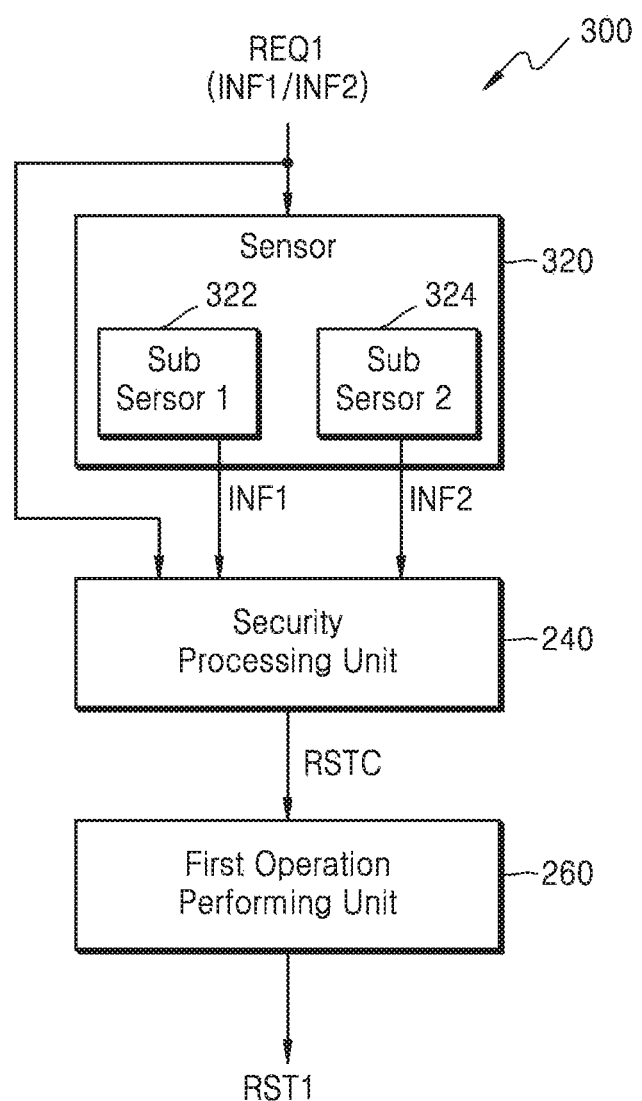

Referring to FIG. 3, in an electronic device 300 according to another embodiment of the inventive concept, a sensor 320 includes a first sub sensor 322 that senses knowledge-based authentication information INF1 and a second sub sensor 324 that senses biometrics-based authentication information INF2. The first sub sensor 322 and the second sub sensor 324 may be formed to respectively correspond to types of the knowledge-based authentication information INF1 and the biometrics-based authentication information INF2 to be processed by the electronic device 200.

Figure 4:
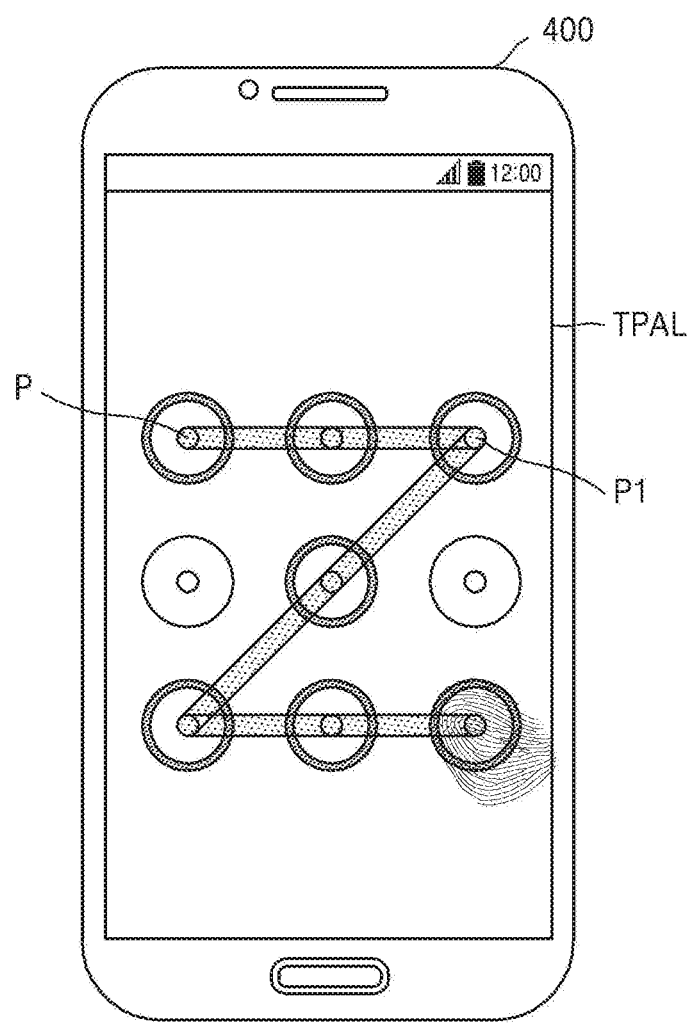

Referring to FIG. 4, an electronic device 400 according to another embodiment of the inventive concept is assumed to a mobile cellular handset, including a display having a touch screen panel (TPAL). When a touch pattern and fingerprint information are respectively set as knowledge-based authentication information INF1 and biometrics-based authentication information INF2 to be processed in the electronic device 400, the first sub sensor 322 may be a touch input sensor associated with the touch screen panel TPAL and capable of recognizing the touch pattern, and the second sub sensor 324 may be a fingerprint sensor capable of obtaining fingerprint information. In certain embodiments, the fingerprint sensor may be integrated within the touch screen panel.

The fingerprint sensor may obtain fingerprint information by extracting details regarding the end point or corners of a fingerprint ridge line, and generating data from the extracted details. Although FIG. 4 illustrates a fingerprint sensor extracting fingerprint information while the touch pattern is being applied to the touch screen panel TPAL, the scope of the inventive concept is not limited to only this approach. For example, the fingerprint sensor may obtain fingerprint information separately from the application of the touch pattern using a designated portion of the touch screen panel TPAL. Alternatively, the fingerprint sensor may obtain fingerprint information via a sensing location external to the touch screen panel TPAL, such as a designated home button.

Figure 5:
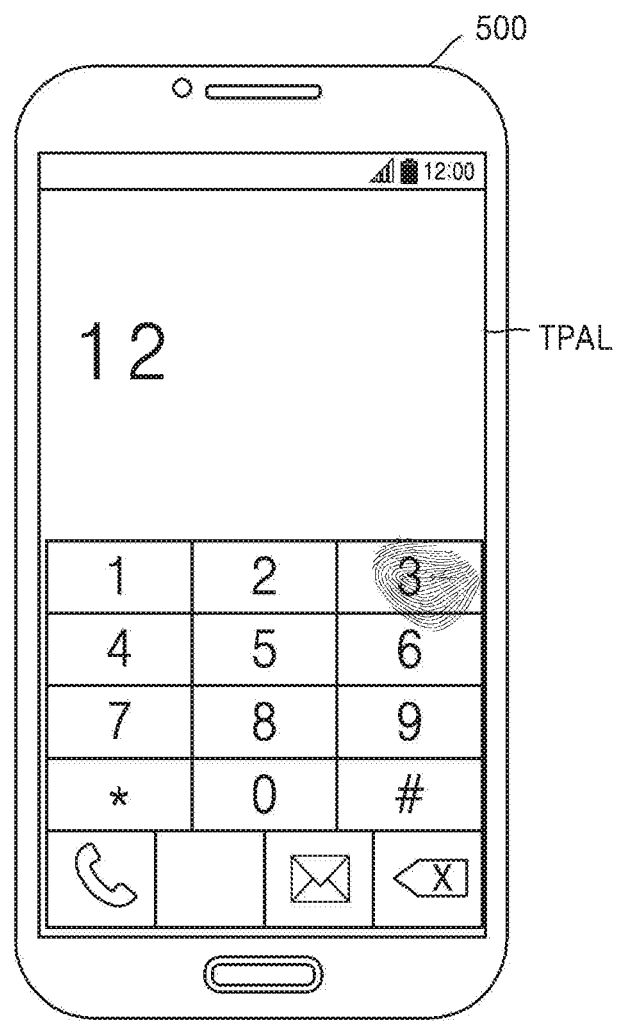

Alternatively, as shown in FIG. 5, when a password and fingerprint information are respectively set as knowledge-based authentication information INF1 and biometrics-based authentication information INF2 to be processed in an electronic device 500, the first sub sensor 322 may be a keypad displayed on a touch screen panel TPAL and the second sub sensor 324 may be a fingerprint sensor that extracts fingerprint information obtained when a password is input via the keypad. However, as described above, the fingerprint sensor may obtain the fingerprint information separately from the password.

Figure 6:
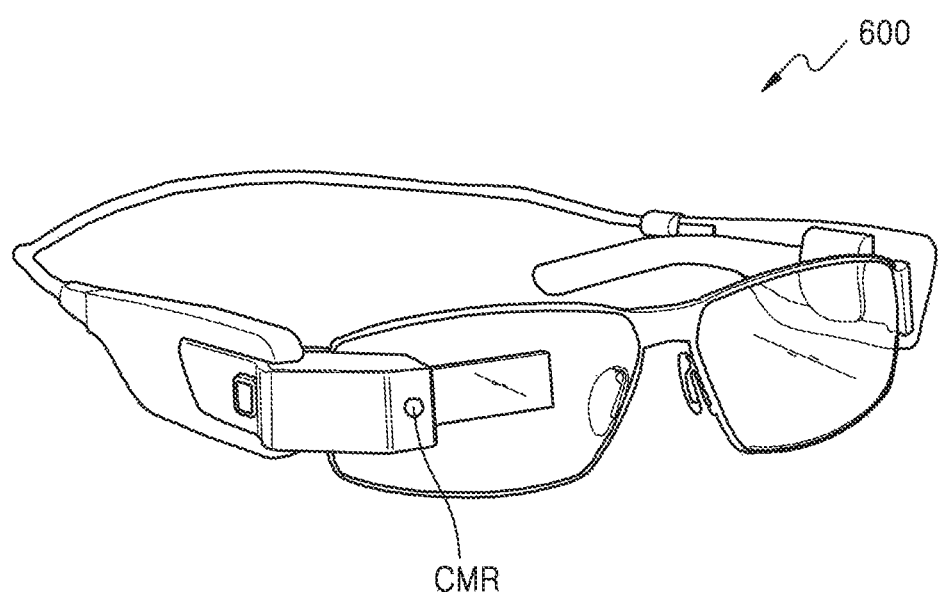

Referring to FIG. 6, an electronic device 600 according to another embodiment of the inventive concept may be a wearable device, such as smart eyeglasses. When a particular motion pattern and iris information are respectively set as knowledge-based authentication information INF1 and biometrics-based authentication information INF2 to be processed by the electronic device 600, the first sub sensor 322 may be a motion sensor and the second sub sensor 324 may be an iris sensor that extracts iris information from an iris image via a camera CMR. The motion sensor may include an acceleration sensor and a gyro sensor, and thus sense motion patterns, such as nodding, of a user wearing the wearable electronic device 600. The iris sensor may obtain the iris information by extracting a shape, color, retinal capillaries of the iris from the iris image and generating data from the extracted information.

Figure 7:
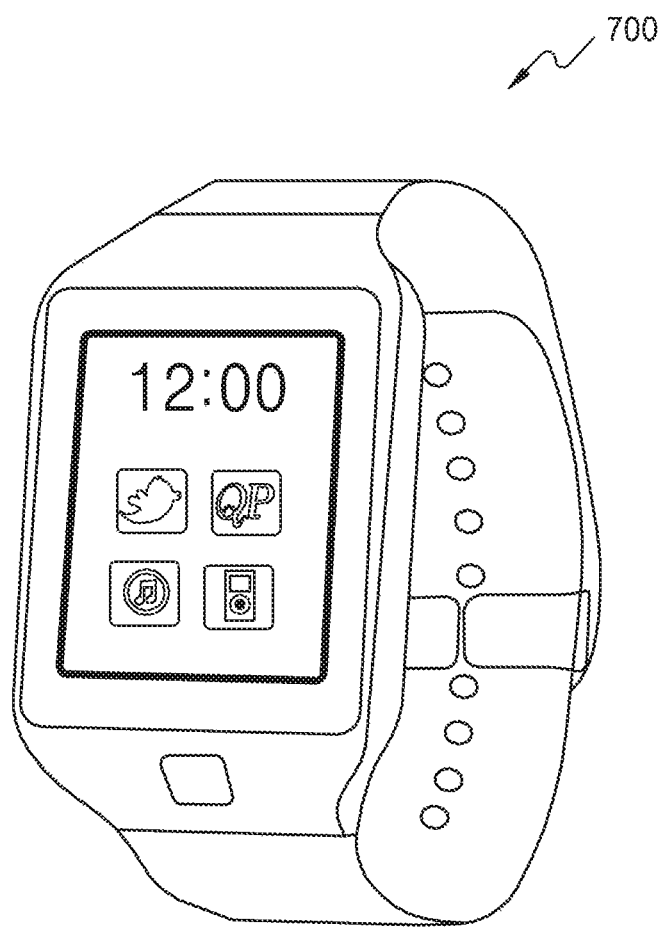

Referring to FIG. 7, an electronic device 700 according to another embodiment of the inventive concept may be a wearable device, such as a smart watch. When a motion pattern and vein information are respectively set as knowledge-based authentication information INF1 and biometrics-based authentication information INF2 processed by the electronic device 700, the first sub sensor 322 may be a motion sensor and the second sub sensor 324 may be a vein sensor. The vein sensor may obtain the vein information by transmitting near-infrared rays through a wrist of a user wearing the electronic device 700, capturing an image of veins in which the transmitted near-infrared rays are absorbed by hemoglobin in the blood, extracting a pattern from the image, and generating data from the extracted pattern.

In addition, a voice pattern or voice information may be obtained by the first sub sensor 322 or the second sub sensor 324 that is provided as a voice sensor. Although the first and second sub sensors 322 and 324 are described as separate components in the embodiments above, the first and second sub sensors 322 and 324 may be provided as a single combined sensor.

Referring back to FIGS. 1 and 2, the security processing unit 240 may be used to generate random number data corresponding to the obtained knowledge-based authentication information INF1 (S140), and process the user authentication request REQ1 based on an authentication code generated by combining the obtained biometrics-based authentication information INF2 and the random number data (S180). Operation of the security processing unit 240 will be described more in some additional detail hereafter. However, the security processing unit 240 may communicate (or transmit) a confirmation result RSTC indicating that the authentication request REQ1 is acceptable to the first operation performing unit 260 sufficient to perform the first operation. For example, when the user authentication request REQ1 is intended to unlock the electronic device 200 as the first operation, the security processing unit 240 may transmit the confirmation result RSTC to the first operation performing unit 260 controlling the locking/unlocking of the electronic device 200.

In response to the confirmation result RSTC, the first operation performing unit 260 may perform the first operation and output a first operation result RST1. For example, the first operation performing unit 260 may unlock the electronic device 200 in response to the confirmation result RSTC.

Figure 8:
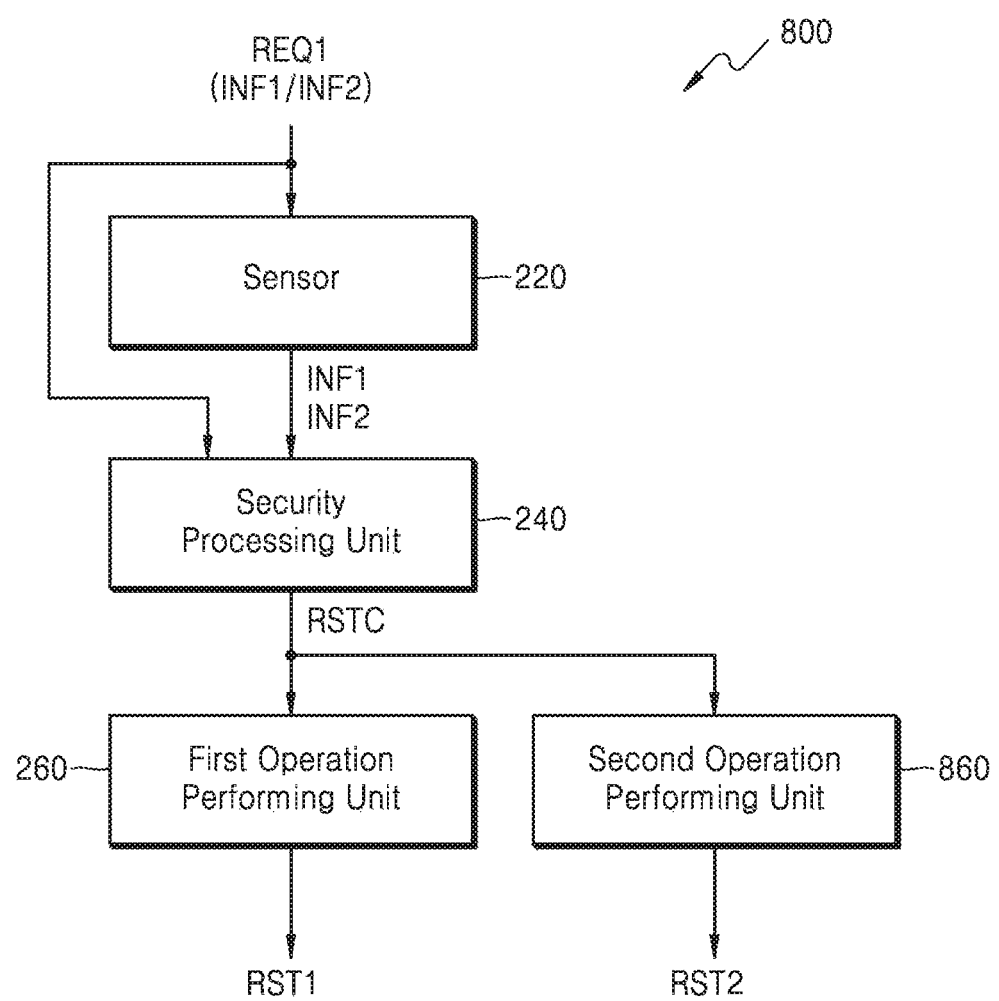

The security processing unit 240 may transmit the confirmation result RSTC to a processor that controls operation of the electronic device 200, and the processor may control the first operation performing unit 260 such that the first operation is performed. Alternatively, referring to FIG. 8, an electronic device 800 according to another embodiment of the inventive concept may further include a second operation performing unit 860 capable of performing a second operation, possibly related to the performing of the first operation, and output a second operation result RST2, where a corresponding confirmation result RSTC is transmitted to the second operation performing unit 860. For example, when the first operation is a payment process controlled by a payment application running on the electronic device 800, the first operation performing unit 260 may require various types of information to authorize access to the payment process. For example, when performing a payment process, a credit/debit card number may be required. Hence, the second operation performing unit 860 may obtain the credit/debit card number stored in a memory (not shown) of the electronic device 800 and provide the credit/debit card number to the first operation performing unit 260. Here, the second operation performing unit 860 may perform the second operation only when a confirmation result RSTC indicating that the preceding user authentication request REQ1 has been accepted by the security processing unit 240. In this manner, access to sensitive data stored in the electronic device 200 may be well secured. Hereinafter, a method of performing user authentication based on the obtained knowledge-based authentication information INF1 and the biometrics-based authentication information INF2 will be described in some additional detail.

Figure 9:
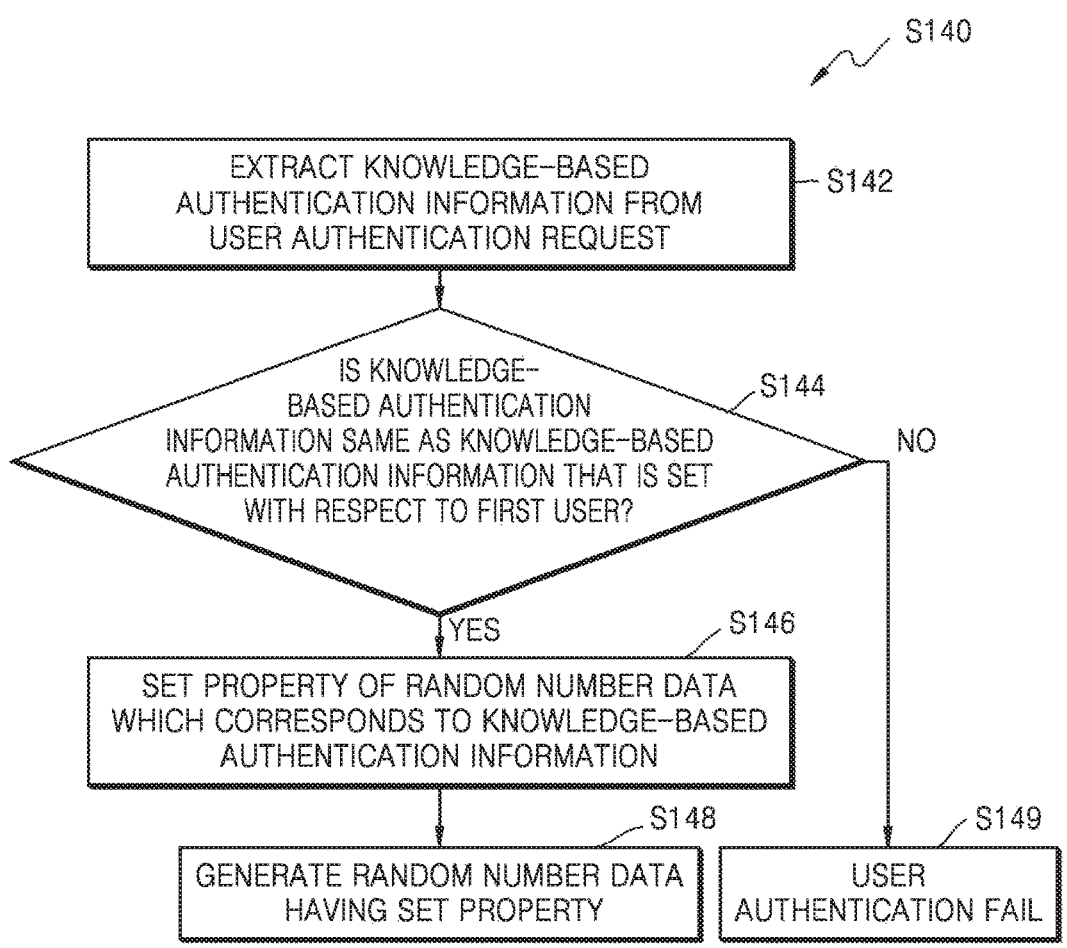
FIG. 9 is a flowchart illustrating a method of generating random number data according to an embodiment of the inventive concept.

FIG. 9 is a flowchart illustrating one approach to the generation of random number data by the method of FIG. 1 according to an embodiment of the inventive concept. Thus, the method step (S140) of generating random number data may be performed by a security processing unit, like the security processing unit 240 of FIG. 2, incorporated within an electronic device according to an embodiment of the inventive concept. For example, the method of generating random number data described in relation to FIG. 9 may be performed by the electronic device 1000 of FIG. 10 according to another embodiment of the inventive concept. Hereinafter, for convenience of description, an example is described in which the method of generating random number data according to FIG. 9 is assumed to be performed by the electronic device 1000 of FIG. 10.

Figure 10:
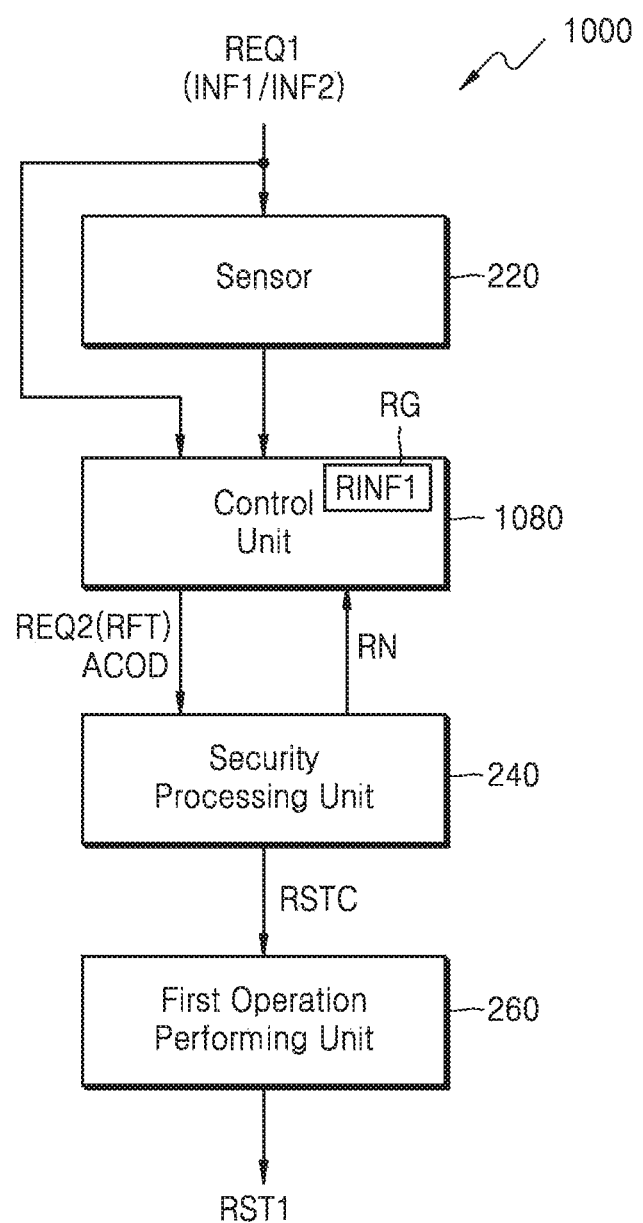
FIG. 10 is a block diagram illustrating an electronic device according to an embodiment.

Referring to FIGS. 9 and 10, the method of generating random number data (S140) includes extracting knowledge-based authentication information INF1 from a user authentication request REQ1 (S142) and verifying whether the knowledge-based authentication information INF1 is knowledge-based authentication information RINF1 that is set with respect to the user (S144). If the knowledge-based authentication information INF1 is the knowledge-based authentication information RINF1 that is set with respect to the user (S144=YES), then a property RFT of random number data RN which corresponds to the knowledge-based authentication information INF1 is (S146), and the random number data RN having the set property RFT is generated (S148). Otherwise, if the knowledge-based authentication information INF1 is not the knowledge-based authentication information RINF1 that is set with respect to the user (S144=NO), then the authentication process is deemed to fail (S149).

Hereinafter, the knowledge-based authentication information INF1 that is set with respect to the user is referred to as reference knowledge-based authentication information RINF1.

As described with respect to the electronic device 200 of FIG. 2, the electronic device 1000 of FIG. 10 may include the sensor 220, the security processing unit 240, and the first operation performing unit 260. The extracting of the knowledge-based authentication information INF1 from the user authentication request REQ1 (S142) may be performed by the sensor 220. The generating of the random number data RN having the property RFT that is set correspondingly to the knowledge-based authentication information INF1 (S148) may be performed by the security processing unit 240.

In addition, the electronic device 1000 of the FIG. 10 may further include a control unit 1080. The control unit 1080 may be separately provided to perform user authentication in the electronic device 1000, or may be provided as a functional block of a processor that controls operations of the electronic device 1000. Upon determining that the knowledge-based authentication information INF1 received from the sensor 220 is the reference knowledge-based authentication information RINF1 (S144=YES), the control unit 1080 may transmit a random number data request signal REQ2 corresponding to the knowledge-based authentication information INF1 to the security processing unit 240. The control unit 1080 may set the property RFT of the random number data RN corresponding to obtained knowledge-based authentication information INF1 (S146). Also, the control unit 1080 may transmit the random number data request signal REQ2 and the set property RFT of the random number data RN, together or separately, to the security processing unit 240. The set property RFT of the random number data RN will be described hereafter.

The control unit 1080 may perform the verifying operation (S144) by comparing the obtained knowledge-based authentication information INF1 and the reference knowledge-based authentication information RINF1 stored in a register RG included in the control unit 1080, for example. The control unit 1080 may receive the reference knowledge-based authentication information RINF1 stored in a storage medium (not shown) of the electronic device 1000 that is located external to the control unit 1080, and compare the reference knowledge-based authentication information RINF1 and the obtained knowledge-based authentication information INF1.

Upon determining that the obtained knowledge-based authentication information INF1 is different from the reference knowledge-based authentication information RINF1 (S144=NO), the control unit 1080 determines that the user authentication request REQ1 has failed (S149). When the security processing unit 240 generates the random number data RN that corresponds to the knowledge-based authentication information INF1 and transmits the random number data RN to the control unit 1080, the control unit 1080 may combine the random number data RN and the biometrics-based authentication information INF2 and generate an authentication code ACOD (S160 of FIG. 1). The security processing unit 240 may verify the authentication code ACOD generated by the control unit 1080 and determine whether to accept the user authentication request REQ1 (S180 of FIG. 1). Further details regarding the generating and verifying of the authentication code ACOD are provided hereafter. First, an example of generating random number data RN having a property RFT corresponding to the obtained knowledge-based authentication information INF1 using the security processing unit 240 will be described.

Figure 11:
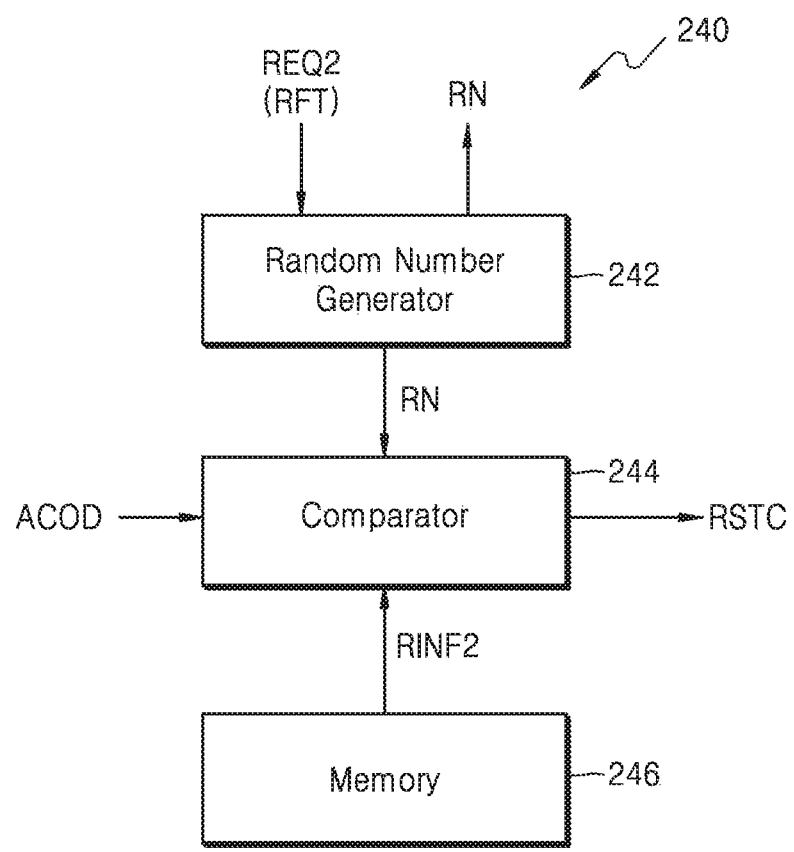
FIG. 11 is a block diagram further illustrating in one example the security processing unit 240 of FIG. 10 according to an embodiment of the inventive concept.
Figure 12:
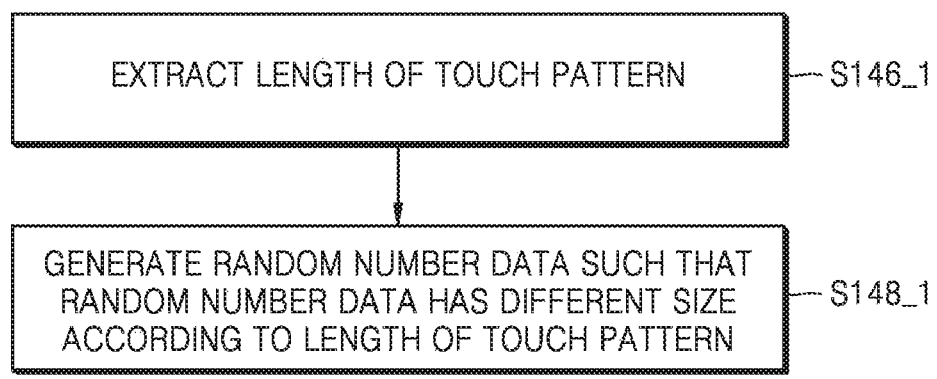
FIGS. 12 to 16 are respective flowcharts illustrating various approaches that may be used during the generation of a random number data according to embodiments of the inventive concept.

FIG. 11 is a block diagram further illustrating the security processing unit 240 of FIG. 10 according to an embodiment of the inventive concept. Referring to FIGS. 10 and 11, the security processing unit 240 includes a random number generator 242, a comparator 244, and a memory 246. In response to the random number data request signal REQ2, the random number generator 242 generates random number data RN corresponding to the obtained knowledge-based authentication information INF1. That is, the random number generator 242 may generate random number data RN having the property RFT input from the control unit 1080.

The property RFT of the random number data RN may be set using at least one method or approach selected from the methods described as examples with respect to FIGS. 12, 13, 14, 15 and 16, and thereafter, the random number data RN having the set property RFT may be generated. First, referring to FIGS. 10, 11 and 12, the knowledge-based authentication information INF1 may be input to the electronic device 1000 as a touch pattern. The control unit 1080 may receive the touch pattern as sensed by the sensor 220, and detect a length of the touch pattern as the property RFT of the random number data RN (S146_1). For example, when the touch pattern includes 7 points P as shown in FIG. 4, the control unit 1080 may set "7" as the property RFT of the random number data RN to be generated.

The random number generator 242 may generate the random number data RN such that the random number data RN has a size that differs in length according to the touch pattern (S148_1). For example, when the property RFT is set as "7," the random number generator 242 may generate random number data RN having a corresponding size of 'A'. Alternatively, when the property RFT is set as "5," the random number generator 242 may generate random number data RN having a size of 'B', where 'A' and 'B' are different positive integers.

Figure 13:
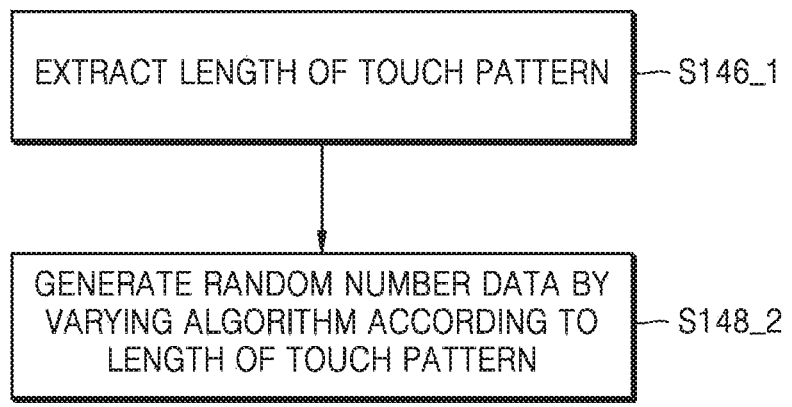

Alternatively, as illustrated in FIG. 13, the random number generator 242 may generate the random number data RN via a different algorithm according to the length of the touch pattern (S148_2). For example, when the property RFT is set as "7," the random number generator 242 may use an algorithm 'X' to generate the random number data RN. As another example, when the property RFT is set as "5," the random number generator 242 may use an algorithm 'Y' to generate the random number data RN, where the algorithm 'X' might generate the random number data RN using a circulation counter while the algorithm 'Y' might generate the random number data RN using a uniform sum value. These are, however, merely examples of possible random number generating algorithms that might be used in one or more embodiments of the inventive concept.

Figure 14:
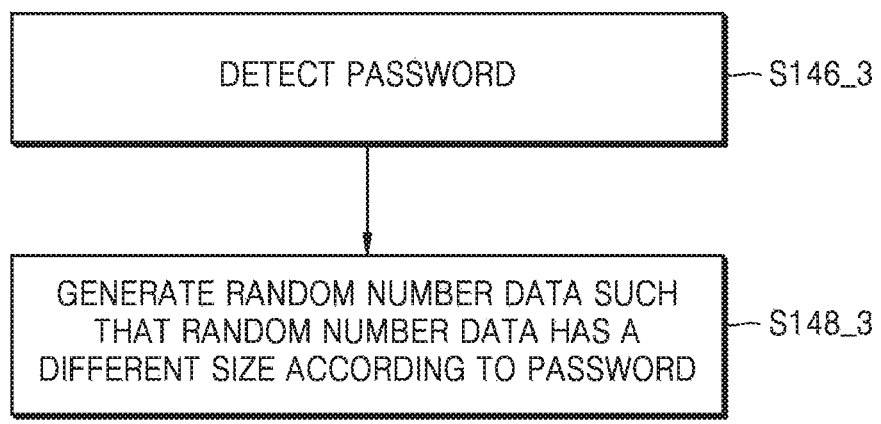

Still alternatively, as shown in FIG. 14, the knowledge-based authentication information INF1 may be input to the electronic device 1000 as a password. The control unit 1080 may detect the password sensed by the sensor 220 as the property RFT of the random number data RN (S146_3). For example, assuming a password of "1234," the property RFT is set to a first value, whereas for a differently assumed password of "0000" the property RFT is set to a second value. The random number generator 242 may generate the random number data RN such that the random number data RN has a different size according to the password (S148_3). For example, when the property RFT is input as the first value, the random number generator 242 may generate random number data RN having a size 'A'. As another example, when the property RFT is input as the second value, the random number generator 242 may generate random number data RN having a size 'B'. However, the random number generator 242 may generate the random number data RN by changing an algorithm according to the value of the password.

Figure 15:
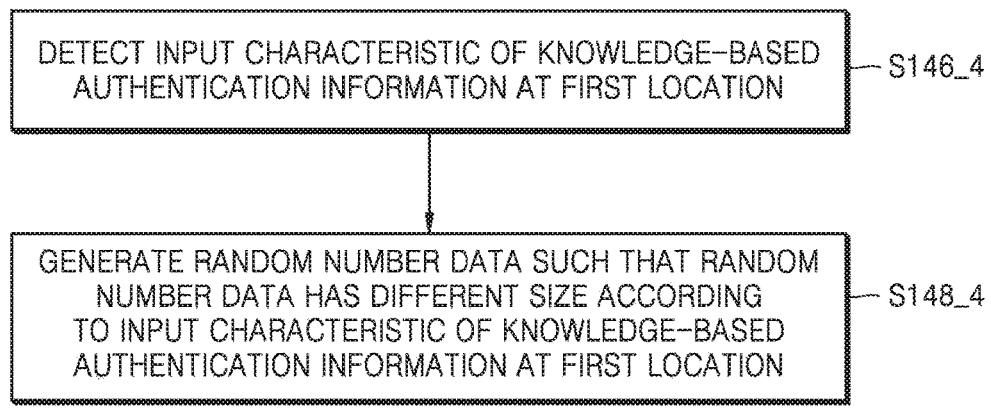

Alternatively, as shown in FIG. 15, the control unit 1080 may detect an input characteristic of the knowledge-based authentication information INF1 obtained by the sensor 220 at a first location as the property RFT of the random number data RN (S146_4). For example, the property RFT may vary according to at least one selected from an input speed, an input direction, and an input force of the knowledge-based authentication information INF1, such as a touch pattern or a digital signature, at a first location of a touch screen panel. Here, the property RFT may vary according to input speed of a touch pattern at a first location P1 on the touch screen panel TPAL of FIG. 4. Alternatively, the property RFT may vary according to the force (e.g., fingertip pressure) applied when touching the keypad of FIG. 5. In this regard, the designated first location may be variably (e.g., user-selected) in location or fixed.

The random number generator 242 generates the random number data RN to have a different size according to the input characteristic of the knowledge-based authentication information INF1 at the first location (S148_4). For example, when the property RFT is input as a first value, the random number generator 242 may generate the random number data RN having a size 'A'. As another example, when the property RFT is input as a second value, the random number generator 242 may generate random number data RN having a size 'B'. Alternatively, the random number generator 242 may generate the random number data RN via other algorithm according to the input characteristic of the knowledge-based authentication information INF1 at the first location.

Figure 16:
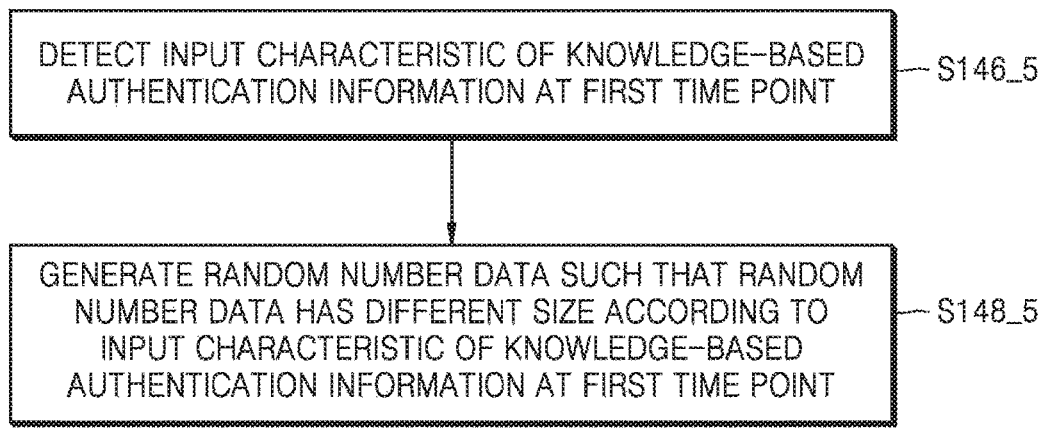

Alternatively, as shown in FIG. 16, the control unit 1080 may detect an input characteristic of the knowledge-based authentication information INF1 obtained by the sensor 220 at a first time point as the property RFT of the random number data RN (S146_5). For example, the property RFT may vary according to at least one factor selected from a group of possible factors including input speed, input direction, and applied input force of the knowledge-based authentication information INF1, such as a touch pattern or a digital signature, at a first time point. Alternatively, when the knowledge-based authentication information INF1 is input as a voice pattern, the property RFT may vary according to an audio frequency peak value at the first time point. Alternatively, when the knowledge-based authentication information INF1 is input as a motion pattern, the property RFT may vary according to variation of motions at the first time point. The first time point may be randomly set or set to a certain time point after the knowledge-based authentication information INF1 is input.

The random number generator 242 may generate the random number data RN to have a different size according to the input characteristic of the knowledge-based authentication information INF1 at the first time point (S148_5). For example, when the property RFT is input as a first value, the random number generator 242 may generate random number data RN having a size 'A'. As another example, when the property RFT is input as a second value, the random number generator 242 may generate random number data RN having a size 'B'. Alternatively, the random number generator 242 may generate the random number data RN by varying an algorithm according to the input characteristic of the knowledge-based authentication information INF1 at the first time point.

The embodiments are not limited to the description above. For example, the property RFT of the random number data RN to be generated may vary according to a shape of the touch pattern. When the shape of the touch pattern is sensed as being the letter 'Z' as shown in FIG. 4, the property RFT may have a first value, and when the shape of the touch pattern is sensed as being similar to the letter 'C' the property RFT have a second value. Also, in addition to the example of generating the random number data RN by varying a size or via other algorithm according to the property RFT, for example, a dimension of the random number data RN may vary. For example, the random number data RN may be 2-dimensional or 3-dimensional according to the property RFT.

Referring back to FIGS. 10 and 11, the random number generator 242 may transmit the random number data RN generated according to at least one of the methods above to the control unit 1080. The random number generator 242 may also transmit the random number data RN to the comparator 244, as described below. As described above, the control unit 1080 may generate the authentication code ACOD by combining the random number data RN and the obtained biometrics-based authentication information INF2 (S160 of FIG. 1). The random number data RN and the obtained biometrics-based authentication information INF2 may be combined using various methods. For example, the random number data RN and the obtained biometrics-based authentication information INF2 may be added to generate a resulting authentication code ACOD.

The security processing unit 240 may determine whether to accept the user authentication request REQ1 by verifying the authentication code ACOD generated by the control unit 1080 (S180 of FIG. 1). The comparator 244 of the security processing unit 240 may compare the authentication code ACOD transmitted from the control unit 1080 to a value generated by combining the random number data RN, which is transmitted from the random number generator 242, and the biometrics-based authentication information INF2, which is set with respect to the user and stored in the memory 246. The memory 246 may be a non-volatile memory. Hereinafter, the biometrics-based authentication information INF2 that is set with respect to the user is referred to as reference biometrics-based authentication information RINF2, and the value generated by combining the reference biometrics-based authentication information RINF2 and the random number data RN is referred to as a verification code.

When the authentication code ACOD transmitted from the control unit 1080 is the same as the verification code, the comparator 244 will output a confirmation result RSTC indicating that the user authentication request REQ1 is accepted. In response to the confirmation result RSTC, the first operation performing unit 260 may perform a first operation. However, when the authentication code ACOD transmitted from the control unit 1080 is different from the verification code, the comparator 244 will output a confirmation result RSTC indicating that the user authentication has failed.

The security processing unit 240 may be implemented in various forms. For example, the security processing unit 240 may be a smart card including an integrated circuit (IC). The smart card may include a security logic and a memory, and may further include a microprocessor, an I/O protocol, or an application program. When the security processing unit 240 is a smart card, the security processing unit 240 is more secure than the control unit 1080. For example, the security processing unit 240 may have a security level of the Evaluation Assurance Level 4 (EAL4), which is appropriate for electronic payment. That is, the security processing unit 240 may be provided as a more secure smart card.

The security processing unit 240 may be provided as a security element that is modular in a form other than the smart card. In addition, the security processing unit 240 may be embedded in the electronic device 1000.

Although FIG. 10 illustrates that the confirmation result RSTC of the user authentication request REQ1 is output from the security processing unit 240, embodiments are not limited thereto. The control unit 1080 may receive the random number data RN and the verification code from the security processing unit 240, compare the authentication code ACOD and the verification code, and then output the confirmation result RSTC. Also, as described below, even when the security processing unit 240 is inactivated, the control unit 1080 may generate the confirmation result RSTC of the user authentication request REQ1.

Figure 17:
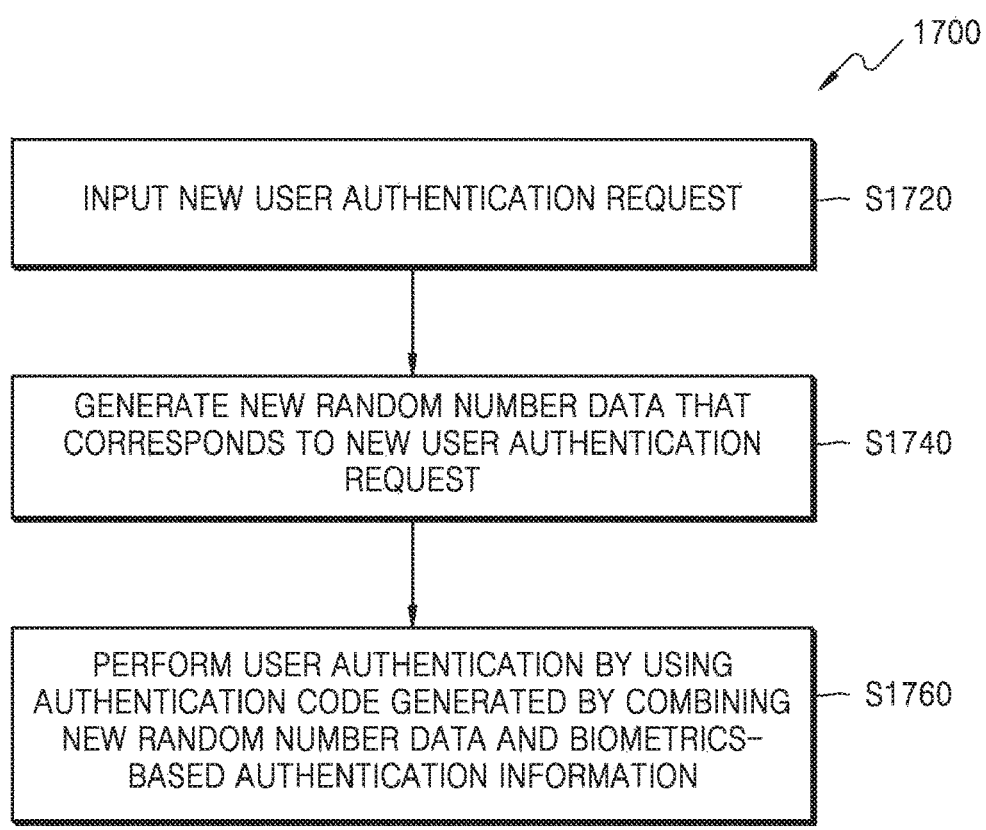
FIGS. 17 and 18 are flowcharts illustrating a user authentication method according to another embodiment of the inventive concept.

FIG. 17 is a flowchart illustrating a user authentication method 1700 according to another embodiment of the inventive concept. Referring to FIG. 17, the user authentication method 1700 may include inputting a new user authentication request (S1720), generating new random number data corresponding to the new user authentication request (S1740), and performing user authentication using an authentication code generated by combining the new random number data and biometrics-based authentication information (S1760). The generating of the new random number data (S1740) and the performing of the user authentication (S1760) may be similarly performed as described in the embodiments above.

According to a user authentication method according to an embodiment and an electronic device performing the user authentication method, when a multi-step authentication is performed using knowledge-based authentication information (a knowledge factor) and biometrics-based authentication information (an inherence factor), random number data that corresponds to the knowledge-based authentication information is used, and thus, security may be enhanced. Also, security may be further enhanced by updating the random number data whenever a user authentication request is generated.

Figure 18:
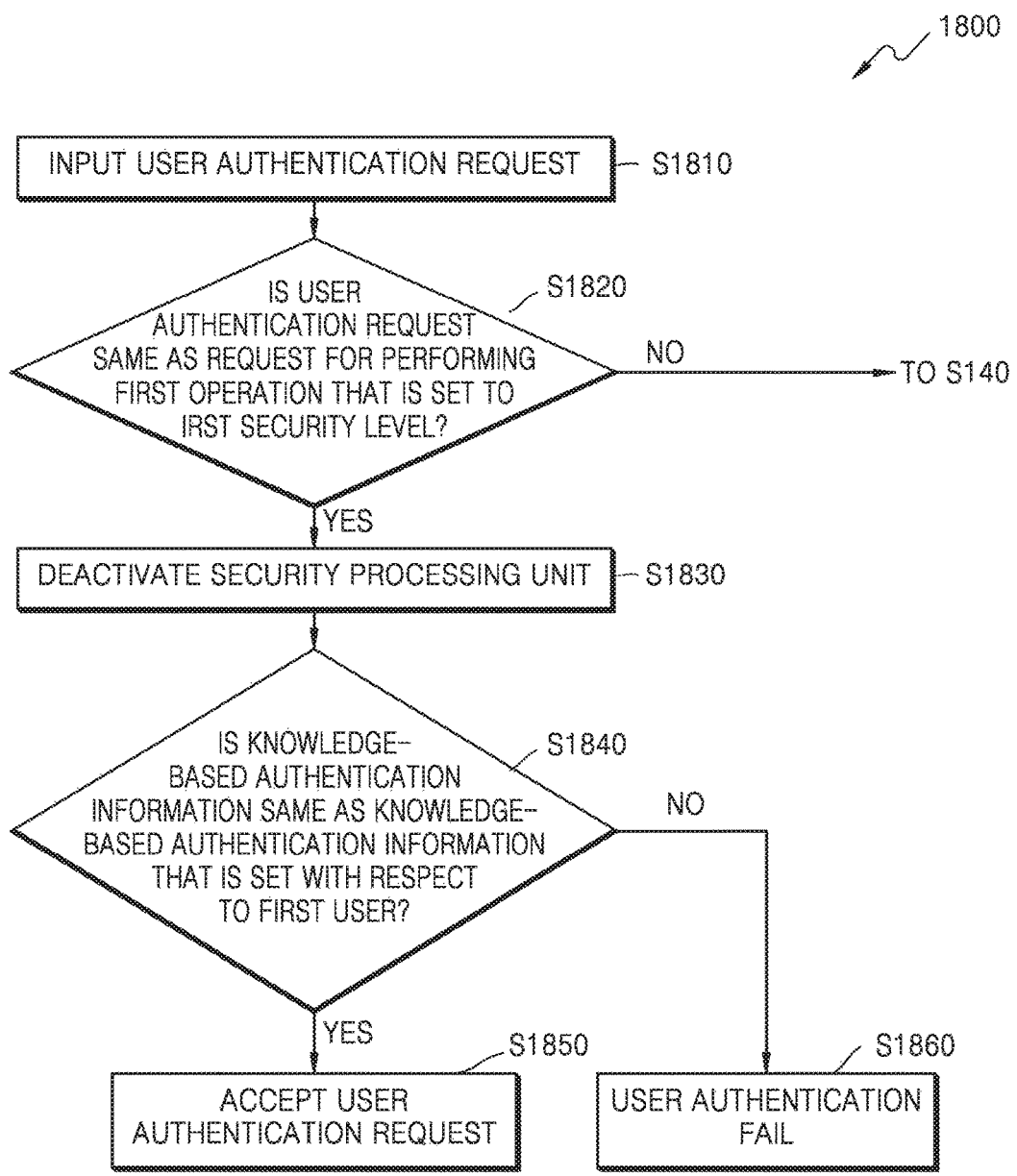

FIG. 18 is a flowchart illustrating a user authentication method 1800 according to another embodiment of the inventive concept. The user authentication method 1800 of FIG. 18 may be performed by the electronic device 1000 of FIG. 10. However, embodiments are not limited thereto, and the user authentication method 1800 of FIG. 18 may be performed by an electronic device according to another embodiment. Referring to FIG. 18 and the control unit 1080 of FIG. 10, when a user authentication request REQ1 is input (S1810), the control unit 1080 may determine whether the user authentication request REQ1 is a request for performing a first operation that is set to a first security level (S1820).

The first security level may be set when a required security level for performing the first operation is relatively low.

When the user authentication request REQ1 is not a request for performing the first operation that is set to the first security level (S1820=NO), the control unit 1080 may control the electronic device 1000 to perform user authentication operations according to the method of FIG. 1. Accordingly, the electronic device 1000 may generate the random number data RN (S140), generate the authentication code ACOD by combining the random number data RN and the obtained biometrics-based authentication information INF2 (S160), and process the user authentication request REQ1 based on the authentication code ACOD.

When the user authentication request REQ1 is a request for performing the first operation that is set to the first security level (S1820=YES), the control unit 1080 may deactivate the security processing unit 240 (S1830). Also, the control unit 1080 may accept the user authentication request REQ1 depending on whether the knowledge-based authentication information INF1 is the same as reference knowledge-based authentication information RINF1. That is, when the knowledge-based authentication information INF1 is the same as the reference knowledge-based authentication information RINF1 (S1840=YES), the control unit 1080 may accept the user authentication request REQ1 (S1850). In this case, the control unit 1080 may instruct the first operation performing unit 260 to perform the first operation. However, when the knowledge-based authentication information INF1 is different from the reference knowledge-based authentication information RINF1 (S1840=NO), the control unit 1080 determines that the user authentication has failed (S1860).

Figure 19:
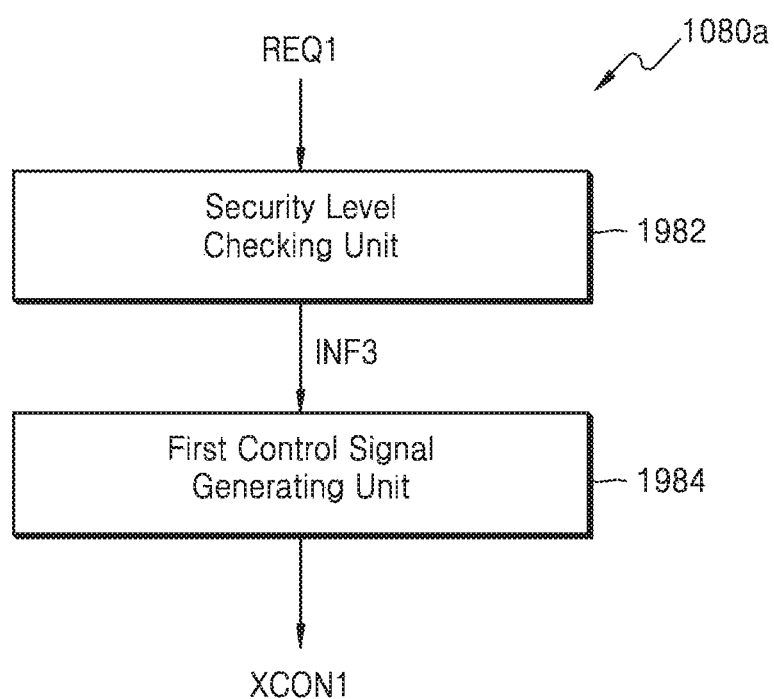
FIGS. 19 and 20 are respective block diagrams illustrating the control unit 1080 of FIG. 10 according to various embodiments of the inventive concept.

FIG. 19 is a block diagram further illustrating in one example (1080a) the control unit 1080 of FIG. 10 according to an embodiment of the inventive concept. Referring to FIG. 19, the control unit 1080a includes a security level checking unit 1982 and a first control signal generating unit 1984. The security level checking unit 1982 checks a security level of an operation requested to be authenticated by the user authentication request REQ1. For example, the security level checking unit 1982 may perform the above checking operation based on security level information of each operation of the electronic device 1000 of FIG. 10, is the security level information being stored in a register (not shown) in the control unit 1080a or a storage device (not shown) outside the control unit 1080a. The security level information of each operation of the electronic device 1000 may be stored in a table in which each index represents an operation and value in the table represents a security level set to each operation.

The security level checking unit 1982 may transmit security level information INF3 of an operation requested to be authenticated by the user authentication request REQ1 to the first control signal generating unit 1984. The first control signal generating unit 1984 may generate a first control signal XCON1 that commands the security processing unit 240 to generate random number data RN that corresponds to the security level information INF3. For example, when a required security level of an operation is low, the first control signal XCON1 may be transmitted to the security processing unit 240 as a first value, and when a required security level of the operation is high, the first control signal XCON1 may be transmitted to the security processing unit 240 as a second value.

For example, the security processing unit 240 generates random number data RN having a first size in response to the first control signal XCON1 (first value), and generates random number data RN having a second size in response to the first control signal XCON1 (second value), where the first size may be smaller than the second size. Also, the security processing unit 240 may generate random number data RN by using an algorithm 'X' in response to the first control signal XCON1 (first value), and generate random number data RN by using an algorithm 'Y' in response to the first control signal XCON1 (second value), where algorithm 'X' generates random number data that is less randomly generated than the random number data generated by the algorithm 'Y'.

According to the user authentication method and the electronic device performing the user authentication method according to various embodiments of the inventive concept, user authentication operations may be differently performed according to a required security level so that system and computational resources, such as power consumption, may be reduced or better controlled while at the same time maintaining acceptable levels of data and/or feature access security.

Figure 20:
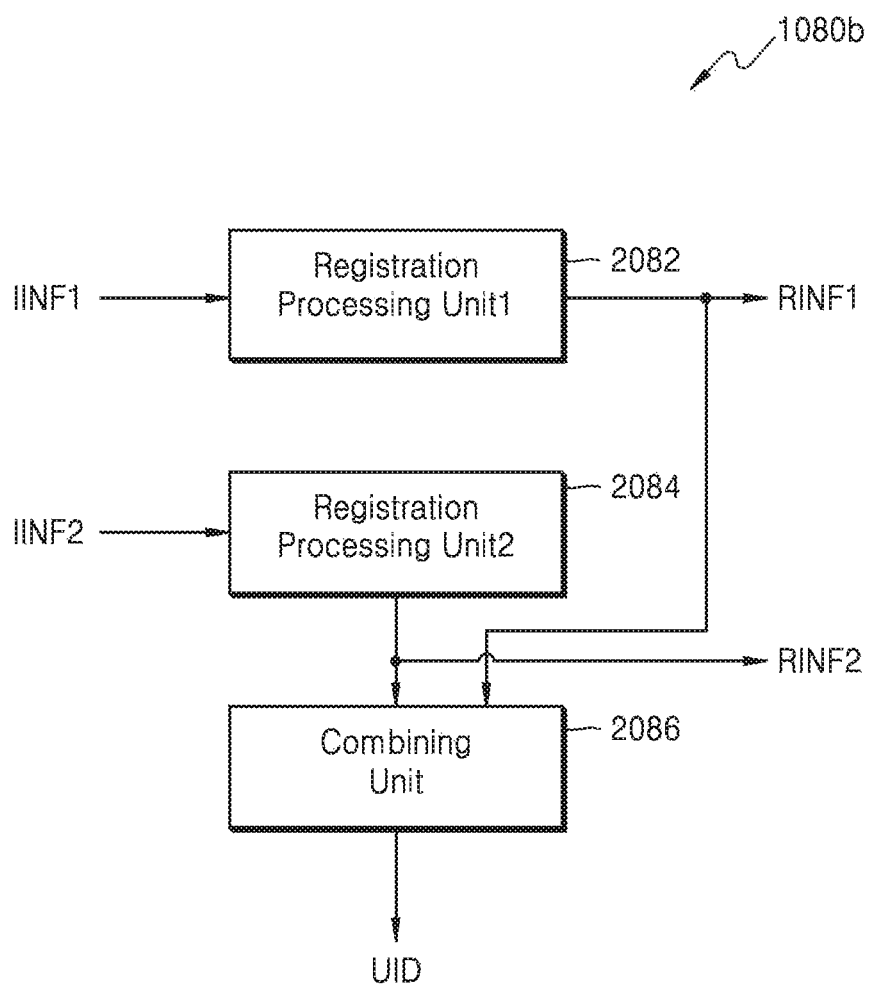

FIG. 20 is a block diagram further illustrating in another example (1080*b*) the control unit 1080 of FIG. 10 according to an embodiment of the inventive concept. Referring to FIG. 20, the control unit 1080*b* includes a first registration processing unit 2082 and a second registration processing unit 2084. The first registration processing unit 2082 may be used to process initial knowledge-based authentication information IINF1 input from a user as reference knowledge-based authentication information RINF1, and the second registration processing unit 2084 may be used to process initial biometrics-based authentication information IINF2 input from a second user as reference biometrics-based authentication information RINF2. For example, the first registration processing unit 2082 and second registration processing unit 2084 may respectively provide users interfaces for inputting the initial knowledge-based authentication information IINF1 and the initial biometrics-based authentication information IINF2.

The respective interfaces for inputting the initial knowledge-based authentication information IINF1 and the initial biometrics-based authentication information IINF2 may be separately provided. However, embodiments of the inventive concept are not limited thereto. The first registration processing unit 2082 and the second registration processing unit 2084 may be combined as one and process the initial knowledge-based authentication information IINF1 and the initial biometrics-based authentication information IINF2 together via a single interface. As described above, the reference knowledge-based authentication information RINF1 may be stored in a register and the reference biometrics-based authentication information RINF2 may be stored in the memory 246 of the security processing unit 240.

The control unit 1080*b* may further include a combining unit 2086. The combining unit 2086 may combine the reference knowledge-based authentication information RINF1 and the reference biometrics-based authentication information RINF2 to generate a user identifier UID. When performing the user authentication operations described in the embodiments above, the user identifier UID may be used instead of the authentication code ACOD in arbitrary operating mode(s).

Figure 21:
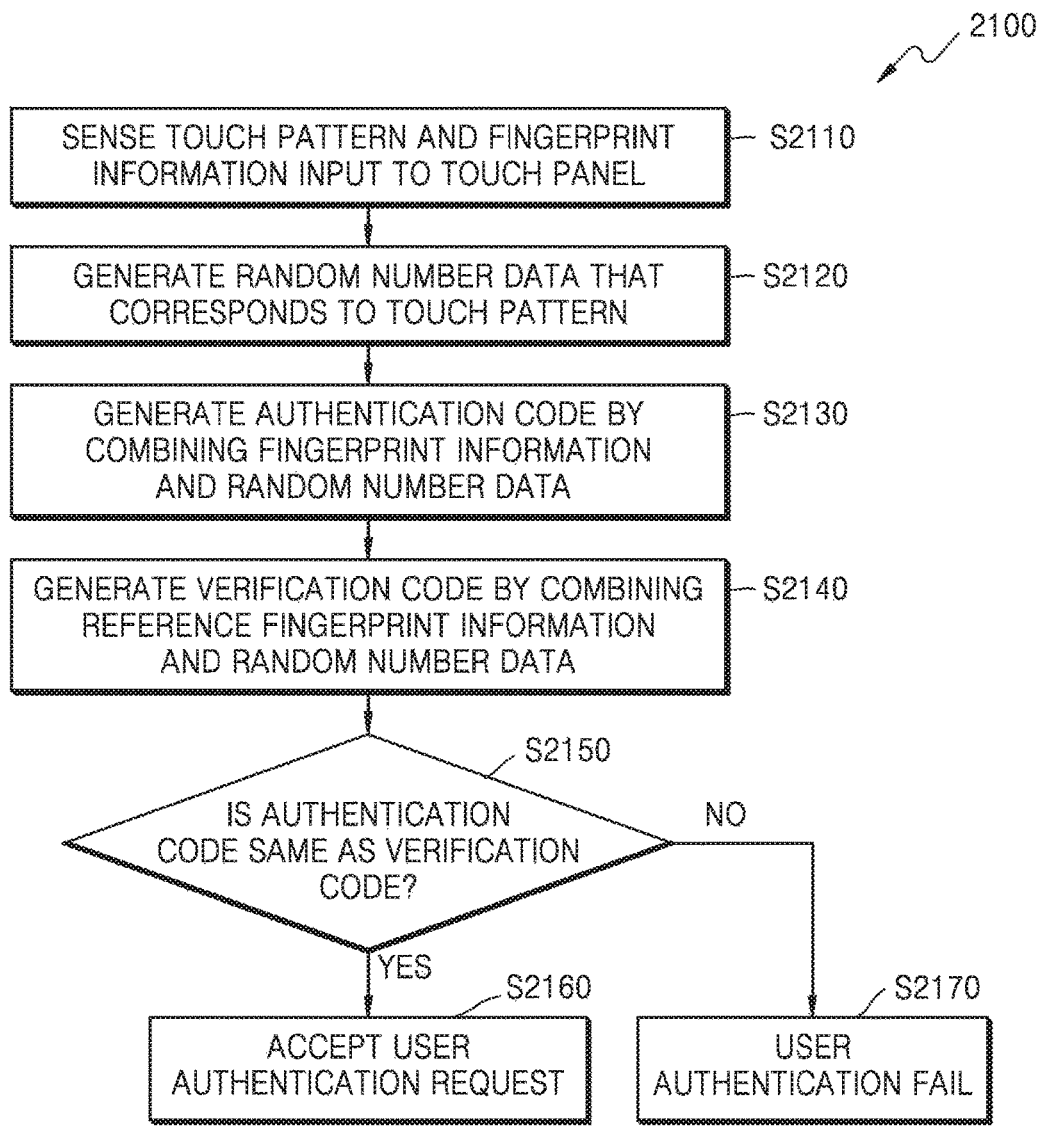
FIG. 21 is a flowchart illustrating a user authentication method according to another embodiment of the inventive concept.

FIG. 21 is a flowchart illustrating a user authentication method 2100 according to another embodiment of the inventive concept. Referring to FIG. 21, the user authentication method 2100 may include sensing a touch pattern and fingerprint information that are input to a touch screen panel (S2110), generating random number data that corresponds to the touch pattern (S2120), generating an authentication code by combining the fingerprint information and the random number data (S2130), generating a verification code by combining reference fingerprint information and the random number data (S2140), determining whether the authentication code and the verification code are the same (S2150). When the authentication code and the verification code are the same (S2150=YES), the user authentication request is accepted (S2160), but when the user authentication code and the verification code are not the same (S2150=NO), the user authentication process is deemed to fail (S2170).

Figure 22:
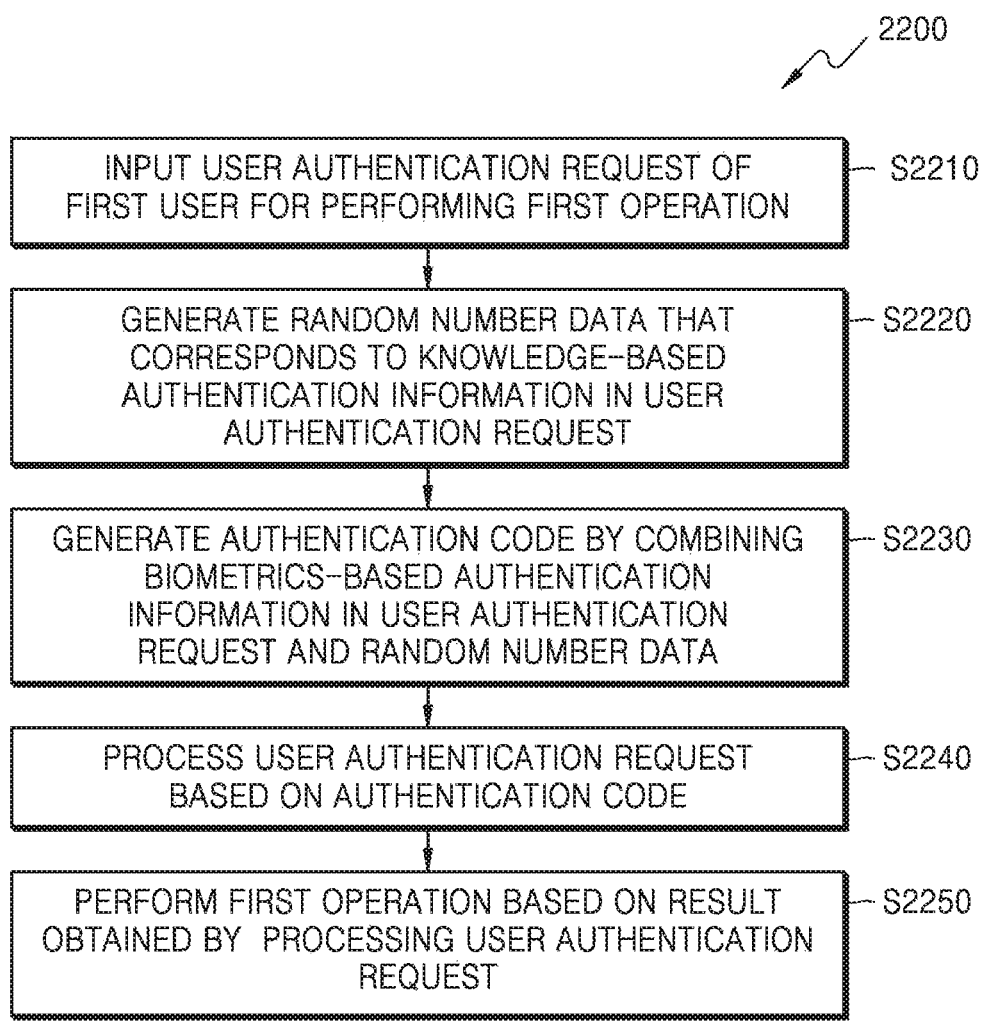
FIG. 22 is a flowchart illustrating a method of operating an electronic device according to an embodiment of the inventive concept.

FIG. 22 is a flowchart illustrating in one example an operation method 2200 that may be performed by an electronic device according to an embodiment of the inventive concept. Referring to FIG. 22, the operating method 2200 includes inputting a user authentication request for a user directed to accessing a first operation (S2210), generating random number data corresponding to knowledge-based authentication information included in the user authentication request (S2220), generating an authentication code by combining biometrics-based authentication information included in the user authentication request and random number data (S2230), processing the user authentication request based on the authentication code (S2240), and performing the first operation in response to a result obtained by processing the user authentication request (S2250).

Details of the user authentication method 2100 of FIG. 21 and the operation method 220 performed by the electronic device of FIG. 22 are substantially the same as described in the foregoing embodiments, and thus will not be repeated.

Figure 23:
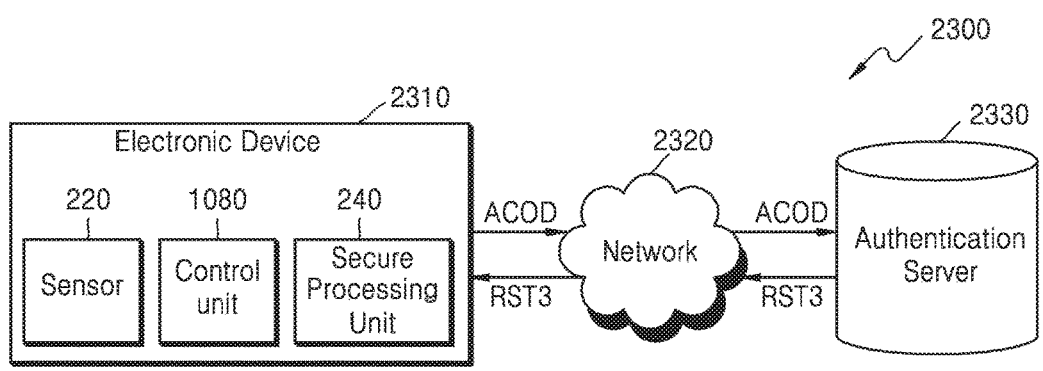
FIGS. 23 and 24 are diagrams describing possible approaches to the operation of an electronic device according to an embodiment of the inventive concept.
Figure 24:
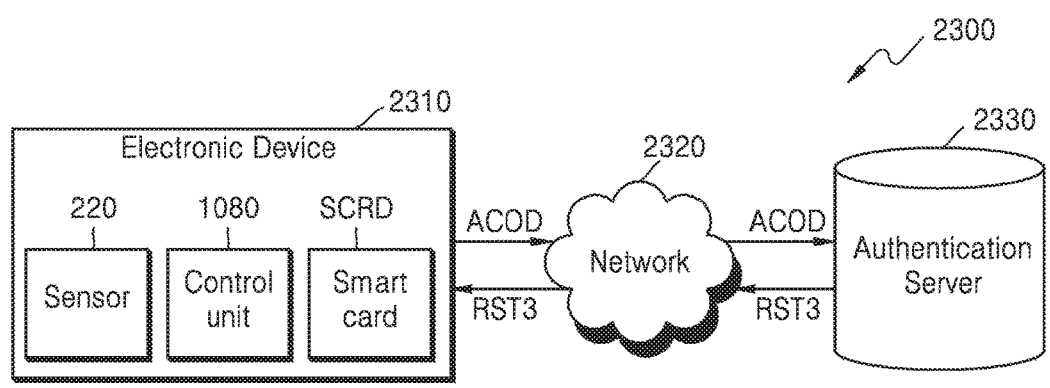

FIGS. 23 and 24 are respective diagrams variously describing operations performed by an electronic device 2310 according to embodiments of the inventive concept. The electronic device 2310 includes the sensor 220, the control unit 1080, and the security processing unit 240 and thus perform the above-described user authentication operations. For example, as shown in FIG. 24, the security processing unit 240 may be a smart card SCRD, but is not limited thereto. As described above, the security processing unit 240 may be provided in various forms, for example, provided as a modular security device other than the smart card or be embedded in the electronic device 2310.

After performing the user authentication operations, when it is determined that a request is from an authorized user, the electronic device 2310 or the security processing unit 240 of the electronic device 2310 may transmit an authentication code ACOD to an authentication server 2330 via a network 2320. The authentication server 2330 may determine the user as an authorized user without requesting for additional information for identifying a user. Then, the authentication server 2330 may perform an operation (e.g., an account transfer or payment) requested by the user, and transmit an operation result RST3 to the user via the electronic device 2310.

Figure 25:
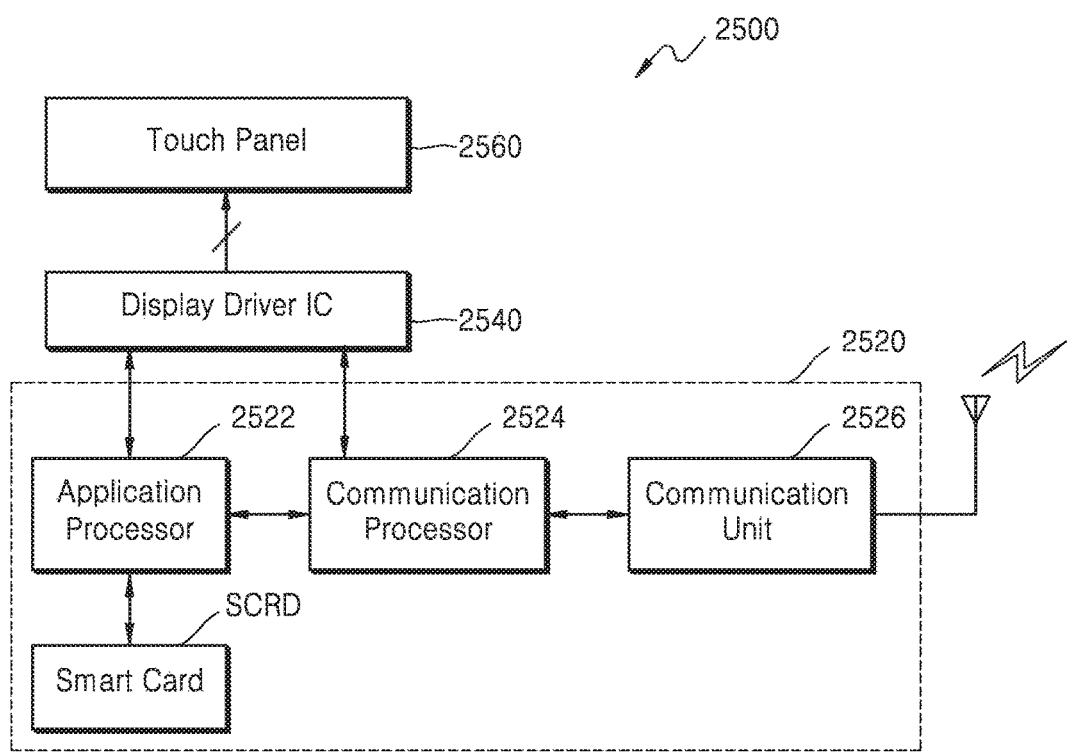
FIG. 25 is a block diagram illustrating an electronic device according to another embodiment of the inventive concept.

FIG. 25 is a block diagram 2500 illustrating an electronic device according to another embodiment of the inventive concept. Referring to FIG. 25, the electronic device 2500 includes a first module 2520, a display driving circuit 2540, and a touch screen panel 2560. The first module 2520 may include an application processor 2522, a smart card SCRD, a communication processor 2524, and a communication unit 2526. The application processor 2522 may process data received by the communication processor 2524, information related to the received data, or data input via a user interface. The user interface may be provided on the touch screen panel 2560 via the display driving circuit 2540. A process result of the application processor 2522 may be transmitted to the communication processor 2524 or the user interface. The communication processor 2524 may provide data received from an external device via the communication unit 2526 or information related to the received data to the application processor 2522, or output the process result of the application processor 2522 to an external device. The communication unit 2526 may perform communication via at least one technology selected from a modem, Wi-Fi, Bluetooth, and Radio Frequency (RF). Also, the communication processor 2524 may display images related to phone calls and text on the touch screen panel 2560 via the display driving circuit 2540. The application processor 2522 may include the control unit 1080 of FIG. 10. The smart card SCRD may store reference biometrics-based authentication information RINF2, and generate random number data RN when the user authentication request REQ1 is input to the electronic device 2500. Also, the smart card SCRD may check the authentication code ACOD generated by the application processor 2522 and determine whether to accept the user authentication request REQ1. Although FIG. 25 illustrates that the smart card SCRD generates the random number data RN and determines whether to accept the user authentication request REQ1, embodiments are not limited thereto. As described above, a modular security device other than the smart card or a security device formed based on a logic embedded in the electronic device 2250 may generate the random number data RN and determine whether to accept the user authentication request REQ1.

While certain embodiments of the inventive concept has been particularly shown and described with reference to the accompanying drawings, the scope of the inventive concept encompasses many modifications and changes in form and details that may be made therein. Accordingly, the scope of the inventive concept is defined by the following claims and their equivalents.

What is claimed is:

1. A user authentication method performed under control of a processor, the user authentication method comprising:
   inputting a user authentication request identifying a user and including knowledge-based authentication information and biometrics-based authentication information;
   generating random number data corresponding to the knowledge-based authentication information;
   generating an authentication code by combining the biometrics-based authentication information and the random number data; and
   processing the user authentication request based on the authentication code,
   wherein the generating of the random number data corresponding to the knowledge-based authentication information comprises:
      extracting the knowledge-based authentication information from the user authentication request and determining whether the extracted knowledge-based authentication information is the same as knowledge-based authentication information stored in the electronic device in relation to the user;
      upon determining that the extracted knowledge-based authentication information is the same as the knowledge-based authentication information stored in the electronic device in relation to the user, setting a length of the random number data, wherein the length is determined by the extracted knowledge-based authentication information and changes depending on the extracted knowledge-based authentication information; and
      generating the random number data after setting the length of the random number.

2. The user authentication method of claim 1, wherein the generating of the random number data is performed whenever a user authentication request is received.

3. The user authentication method of claim 1, wherein the knowledge-based authentication information comprises pattern information including at least one of a motion pattern, a voice pattern, and a touch pattern.

4. The user authentication method of claim 1, wherein the knowledge-based authentication information comprises at least one of a digital signature, a personal identification number, and a password.

5. The user authentication method of claim 1, wherein the biometrics-based authentication information comprises at least one of fingerprint information, iris information, retina information, vein information, face information, and voice information.

6. The user authentication method of claim 1, wherein the processing of the user authentication request comprises:
   generating a verification code by combining biometrics-based authentication information set with respect to the user and the random number data;
   determining whether the verification code is the same as the authentication code; and
   upon determining that the verification code is the same as the authentication code, accepting the user authentication request.

7. The user authentication method of claim 1, wherein the generating of the random number data and the processing of the user authentication request are performed on a smart card comprising an integrated circuit.

8. A user authentication method performed under control of a processor, the user authentication method comprising:
   inputting a touch pattern and fingerprint information applied by a user via a touch screen panel;
   generating random number data corresponding to the input touch pattern;
   generating an authentication code by combining the fingerprint information and the random number data;
   generating a verification code by combining reference fingerprint information and the random number data; and
   upon determining that the authentication code is the same as the verification code, accepting the user authentication request,
   wherein the generating of the random number data corresponding to the input touch pattern comprises:
      determining whether the input touch pattern is the same as a touch pattern stored in the electronic device in relation to the user;
      upon determining that the input touch pattern is the same as the touch pattern stored in the electronic device in relation to the user, setting a length of the random number data, wherein the length is determined by a number of points in the input touch pattern and changes depending on the number of points in the input touch pattern; and
      generating the random number data after setting the length of the random number.

9. A method controlling user access to an electronic device, the method comprising:
   providing a user authentication request to the electronic device by the user, wherein the user authentication request includes knowledge-based authentication information and biometrics-based authentication information;

generating random number data corresponding to the knowledge-based authentication information, and generating an authentication code associated with the user authentication request by combining the biometrics-based authentication information and the random number data; and controlling access by the user to the electronic device in response to the authentication code, wherein the generating of the random number data comprises:

extracting the knowledge-based authentication information from the user authentication request and determining whether the extracted knowledge-based authentication information is the same as knowledge-based authentication information stored in the electronic device in relation to the user;

upon determining that the extracted knowledge-based authentication information is the same as the knowledge-based authentication information stored in the electronic device in relation to the user, setting a property of the random number data, wherein the property corresponds to the extracted knowledge-based authentication information, and generating the random number data after setting the property, wherein the setting of the property of the random number data comprises setting a length of the random number data based on the extracted knowledge-based authentication information and changes depending on the extracted knowledge-based authentication information.

10. The method of claim 9, wherein the knowledge-based authentication information provided by the user to the electronic device is a password, and the property of the random number data is set according to the password.

11. The method of claim 9, wherein the electronic device comprises a touch screen panel, and the providing of the user authentication request to the electronic device by the user comprises:

providing a touch pattern by the user to the touch screen panel, wherein the knowledge-based authentication information is the touch pattern and the property of the random number data is set according to at least one of a length of the touch pattern and a shape of the touch pattern.

12. The method of claim 9, wherein the generating of the random number data comprises sensing an input characteristic of the knowledge-based authentication information, and the property of the random number data is set according to the input characteristic of the knowledge-based authentication information.

13. The method of claim 12, wherein the electronic device includes a touch screen panel and wherein the sensing of the input characteristic of the knowledge-based authentication information comprises sensing at least one of an input speed, an input direction, and an input force of the user providing the touch pattern to the touch screen panel.

14. The user authentication method of claim 12, wherein the sensing of the input characteristic of the knowledge-based authentication information comprises sensing at least one of an input speed and an input size during the providing of the touch pattern by the user to the touch screen panel.

15. The method of claim 9, wherein the knowledge-based authentication information comprises at least one of a motion pattern, a voice pattern, and a touch pattern, and the biometrics-based authentication information comprises at least one of fingerprint information, iris information, retina information, vein information, face information, and voice information.

16. The method of claim 9, wherein the knowledge-based authentication information and the biometrics-based authentication information are concurrently provided to the electronic device by the user.

* * * * *